Nov. 24, 1959  R. W. BOSSE  2,913,933
DRILLING EQUIPMENT
Filed March 20, 1958  4 Sheets-Sheet 1
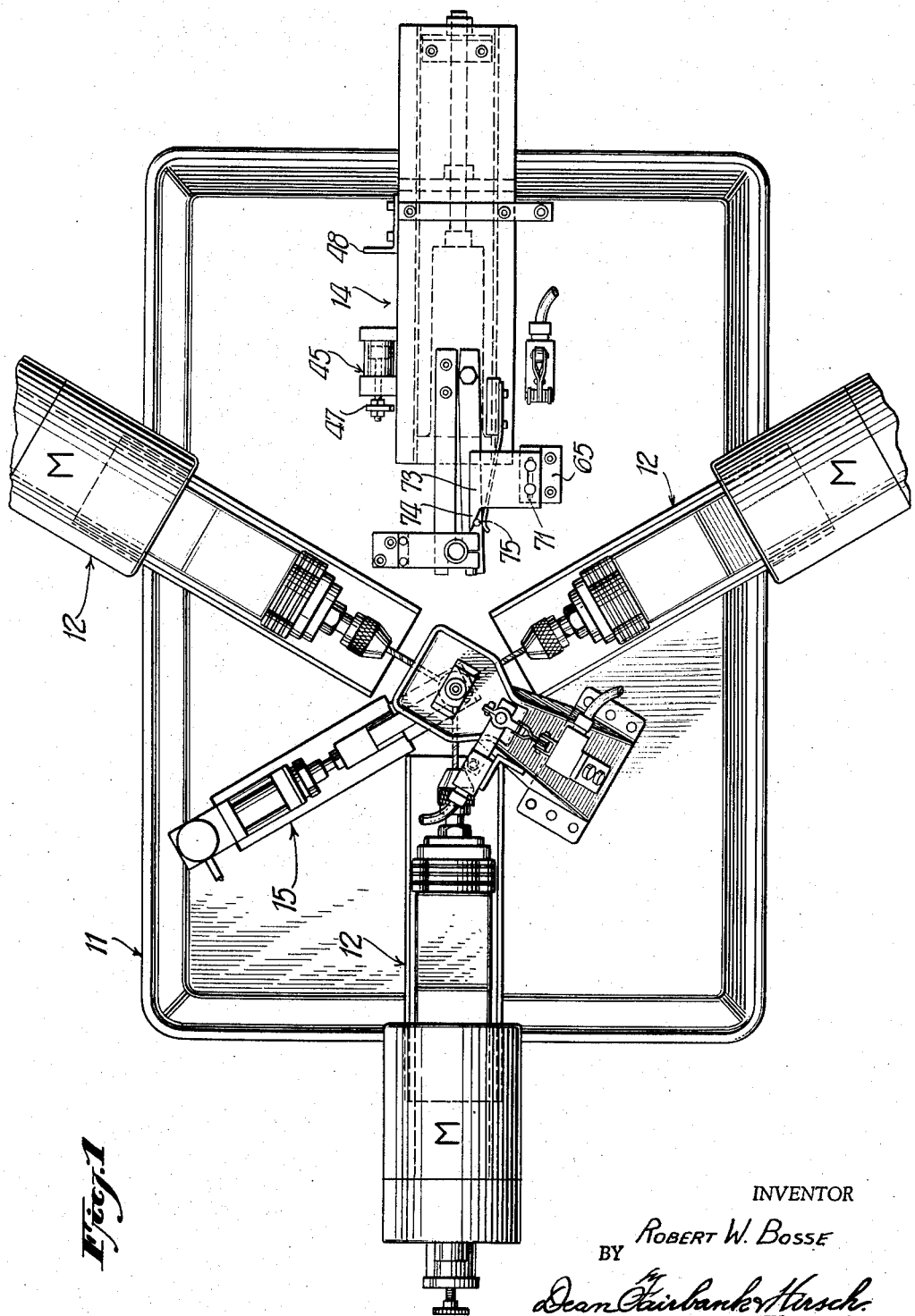
INVENTOR
*Robert W. Bosse*
BY
*Dean Fairbank & Hirsch*
ATTORNEYS.

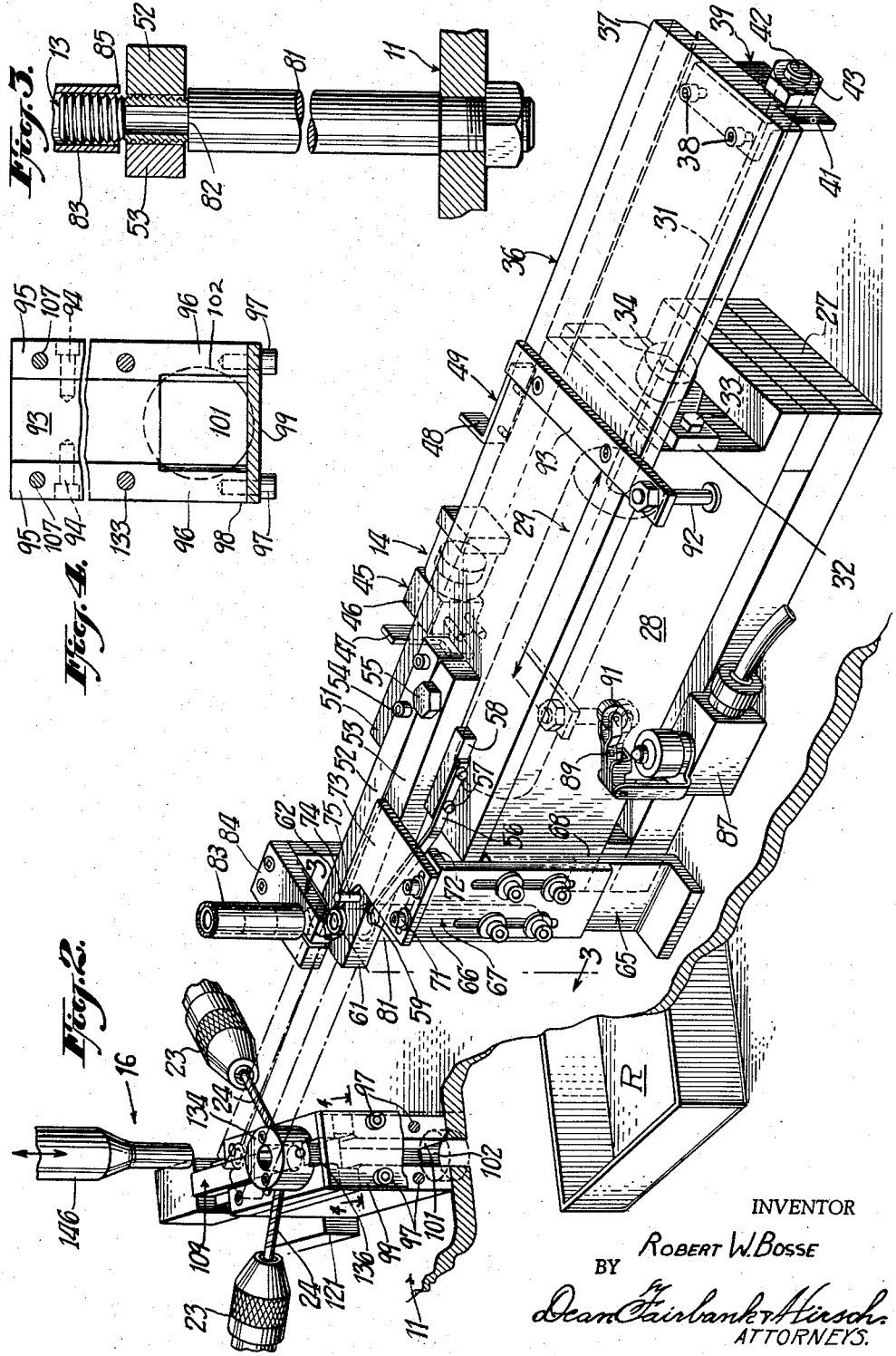

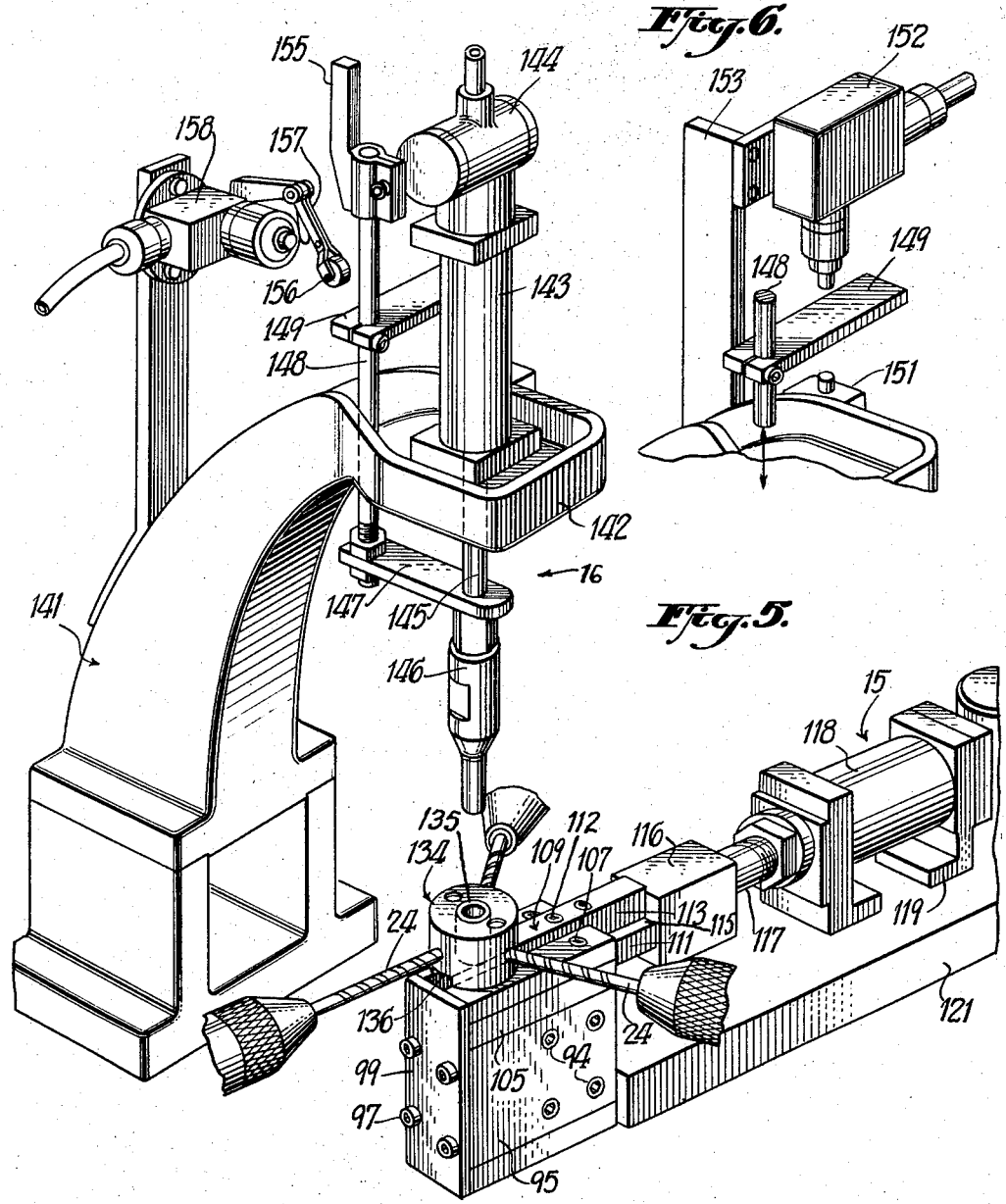

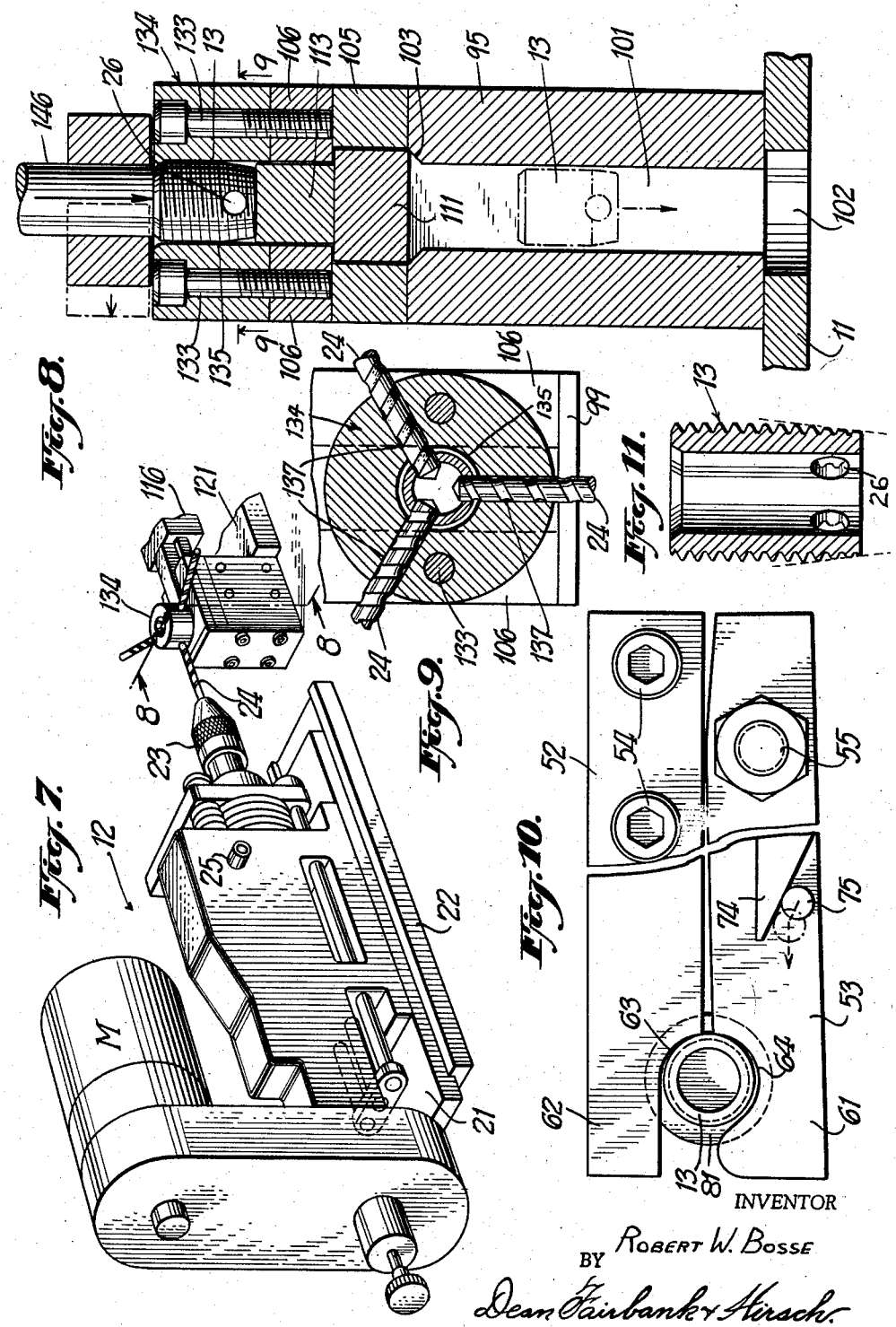

United States Patent Office 2,913,933
Patented Nov. 24, 1959

2,913,933

DRILLING EQUIPMENT

Robert W. Bosse, North Bergen, N.J., assignor to Groov-Pin Corporation, a corporation of New York Application March 20, 1958, Serial No. 722,694

14 Claims. (Cl. 77—26)

This invention relates to the art of drilling equipment and more particularly to equipment to drill a plurality of holes to form self-tapping inserts of the type shown and described in Patent No. 2,795,221, dated June 11, 1957.

As conducive to an understanding of the invention, it is noted that in order for inserts of the above type to be economically manufactured in large quantity, after they have been threaded and chamfered in conventional manner, the individual inserts must be drilled in rapid succession with assurance that the holes are substantially burr free and have their axes in the same plane at a predetermined distance from the lower edge of the insert.

Where the holes are drilled by a plurality of individual drilling units each reciprocable in a horizontal plane toward and away from the insert and with each change in size of the drills used it is necessary individually to adjust the drilling units to attempt to have the axis of each of the drills in the same horizontal plane, even with extreme care in adjustment, it is difficult to have the axes of the plurality of drilling units and hence the drilled holes in the insert, in the same plane, with the result that undue build-up of torque may occur when the insert is driven which might cause stripping of the internal threads of the insert or the threads of the driving tool.

Where the drills vibrate substantially as they form the holes in the insert, the resultant drilled hole is likely to have burrs which would cause enlargement of the threads cut by the self-tapping insert so that the insert might not fit tightly in the unit in which it is positioned.

It is accordingly among the objects of the invention to provide an automatic equipment for forming a plurality of holes in a self-tapping insert, which equipment is relatively simple in construction and not likely to become deranged even with long use and will process inserts in rapid succession with a minimum of vibration of the drills, thereby dependably forming a plurality of substantially burr free holes in the insert having their axes lying in the same horizontal plane at a predetermined distance from the lower edge of the insert, and which may readily be adjusted with each change in drill size to locate the axes of the holes at a predetermined distance from the lower edge of the insert with assurance that the axes of all the holes will lie in the same horizontal plane.

According to the invention these objects are accomplished in the manner hereinafter described and particularly recited in the claims.

In the accompanying drawings in which are shown one or more of various possible embodiments of the several features of the invention, Fig. 1 is a top plan view of the equipment, Fig. 2 is a fragmentary perspective view with parts broken away showing the feeding and holding units, Fig. 3 is a sectional view taken along line 3—3 of Fig. 2, Fig. 4 is a view taken along line 4—4 of Fig. 2, Fig. 5 is a fragmentary perspective view of the holding and clamping units, Fig. 6 is a fragmentary perspective view of two of the control micro-switches, Fig. 7 is a fragmentary perspective view of a drilling unit and the holding unit, Fig. 8 is a sectional view taken along line 8—8 of Fig. 7, Fig. 9 is a transverse sectional view taken along line 9—9 of Fig. 8, Fig. 10 is a fragmentary top plan view of the transfer jaws, and Fig. 11 is a longitudinal sectional view of an insert.

Referring now to the drawings, as shown in Fig. 1, the equipment comprises a table 11 on which all of the components are mounted. These components illustratively comprise three identical drilling units 12 of conventional type such as that put out by the Bellows Company of Akron, Ohio, and designated the "Bellows Locke Drilling Unit." The drilling units 12 are illustratively spaced 120 degrees apart so that the holes 26, Fig. 11, drilled in the self-tapping inserts 13 will be correspondingly spaced.

Also mounted on the table 11, Fig. 1, illustratively midway between two of the drilling units 12 is a feeding unit 14 which successively advances the inserts 13 to a holding unit 15 with which the drilling units 12 coact, a clamping unit 16, Fig. 2, being associated with the holding unit 15.

The drilling units 12, Fig. 7, each comprises a carriage 21 which is slidably mounted on a plate 22 secured to the table so that the position of the carriage may be set as desired. The drilling unit has a chuck 23 in which a drill 24 of desired size may be secured and in conventional manner, the drill is rotated by its associated motor M and reciprocated as by compressed air applied to inlet 25 to drill the hole 26 in the insert.

The feeding unit 14 (Fig. 2) comprises a plate 27 which mounts a housing 28 in which is mounted a reciprocating device such as an air cylinder 29, the latter having a piston rod 31 which extends through an opening in a cross bar 32 secured as by screws 33 to the outer end of the housing 28, a stop sleeve 34 of hardened steel through which the rod 31 extends being secured to the bar 32.

Slidably mounted on the top of the housing 28 is a feed plate 36 to the undersurface of the outer end 37 of which is secured as by screws 38, and L-shaped bracket 39, the depending leg 41 of which has an opening through which the reduced diameter threaded outer end 42 of the piston rod 31 extends. The piston rod 31 is secured to leg 41 as by nuts 43 so that the feed plate 36 may be reciprocated by the air cylinder 29.

To take up the shock due to the abutment of leg 41 against stop 34, a shock absorber 45 is desirably provided. Referring to Fig. 2, the shock absorber 45 may comprise an air cylinder 46 secured to the side wall of the housing 28 and having an upstanding finger 47 affixed to the outer end of its piston rod. The finger 47 is in the path of movement of the laterally extending leg 48 of a bracket 49 secured to the side edge of the feed plate 36, and is designed to be engaged by the leg 48 just before the leg 41 contacts the stop 34. Thus, by reason of the compression of the air in the air cylinder the speed of movement of plate 36 due to the actuation of cylinder 29, will be reduced thereby to reduce the impact of leg 41 against stop 34.

Mounted on the end 51 of the feed plate 36 and extending longitudinally thereof is a pair of transfer jaws which illustratively comprise a pair of elongated bars 52, 53 (Figs. 2 and 10). The bar 52 is secured to the plate 36 as by screws 54 so that it is restrained from movement and the bar 53 is pivotally mounted on the plate as at 55 so that it is movable laterally with respect to bar 52.

The bar 53 is normally urged toward bar 52 as by a leaf spring 56 secured as by screws 57 at one end to a block 58 affixed to feed plate 36 with the free end 59 of the spring reacting against the outer end 61 of the bar 53 to urge it toward the outer end 62 of bar 52.

As shown in Fig. 10, the adjacent inner surfaces 63, 64 of the outer ends of bars 52, 53 are curved to form clamping conformations so that they will securely grip an insert 13 positioned therebetween in the manner hereinafter to be described.

Means are provided to effect movement of the pivoted bar 53 against the tension of spring 56 to space the end 61 thereof from end 62 of bar 52 so that an insert may be positioned therebetween. To this end, as shown in Fig. 2, an L-shaped bracket 65 is secured to the table top 11 and the vertical leg 66 of a second L-shaped bracket 67 is adjustably mounted on the vertical leg 68 of bracket 65. Affixed as by screws 71 to the horizontal leg 72 of bracket 62 is a cam plate 73 which extends laterally over the bar 53 as is clearly shown in Fig. 2. The cam plate 73 has a beveled cam finger 74 extending laterally therefrom which is designed to be engaged by an upstanding pin 75 rising from bar 53 adjacent the end 61 thereof.

Thus, when the feed plate is in the retracted position shown in Fig. 2, the pin 75 will have moved along the beveled surface of finger 74 pivoting the bar 53 in a counterclockwise direction about its pivot 55 to move the end 61 away from the end 62 of fixed bar 52 so that an insert may be positioned therebetween.

The clamping conformations 63, 64 of the bars 52, 53 when the feed plate is in the retracted position shown, are positioned directly over a stop post 81, which as shown in Fig. 3 rises from the table top 11 and has its upper end 82 below and slightly spaced from the bars 52, 53.

Positioned directly above the post 81 and axially aligned therewith as shown in Figs. 2 and 3 is a feed tube 83 which is supported in a horizontal bracket 84.

The thickness of the bars 52, 53 is less than that of the insert 13 to be clamped therebetween as shown in Fig. 3, and the upper end 82 of the post 81 is spaced from the undersurface of bars 52, 53 by a distance such that with the lower end of the insert resting on said end 82, the upper end of the insert will extend slightly above the top surface of the bars 52 and 53. The lower end 85 of the feed tube 83 is positioned above the bars 52, 53 by a distance such that it is also above the upper end of the insert resting on the post 81.

Associated with the feeding unit is a control mechanism, the function of which will be hereinafter described. As shown in Fig. 2, the control mechanism comprises a micro-switch 87 mounted on the table top 11 along the side of housing 28. The micro-switch has a control arm 89 with a roller 91 at its free end, and a pin 92 depending from a supporting strip 93 affixed to the feed plate 36 engages the roller 91 of micro-switch 87 to actuate the latter when the feed plate is in extended position.

The holding unit 15 shown in Figs. 2, 4, 7 and 8 desirably comprises a block 93 rising from the table top 11 and secured thereto. Affixed to the side walls of the block 93 as by screws 94 are side plates 95 which extend beyond the block as at 96. Affixed as by screws 97 to the ends 98 of the plates 95 is an end plate 99, which rises above the upper end of block 93 as shown in Fig. 5. Thus, the block 93, the side wall portions 96 and the end plate 99 form a discharge channel 101 which is positioned over an aperture 102 of greater dimensions in table top 11. Desirably the inner edges of the side plates 95 are chamfered as at 103 as shown in Fig. 8 to permit unimpeded movement of inserts 13 through channel 101.

Mounted on the upper ends of side plates 95 are rectangular bars 105 each of width such that its inner edge is aligned with the chamfered portion 103 of the associated plate 95.

Mounted on each of the bars 105 is a bar 106, each of greater width than the associated bar 105 so as to extend inwardly thereof as shown in Fig. 8, the bars 105 and 106 being secured to the associated plate 105 as by screws 107.

The bars 105, 106 define a track for a slide member 109 which, as shown in Figs. 5 and 8, comprises a rectangular bar 111 of width such that it may fit between bars 105 and of height such that it may fit between the top of block 93 and the undersurface of the inwardly extending inner edges of bars 106. Secured to bar 111 as by screws 112 is a bar 113 of width such that it may fit between bars 106.

The end 115 of bar 111 is secured as by welding to a block 116 which in turn is secured to the outer end of the plunger rod 117 of a reciprocating device such as an air cylinder 118 mounted by brackets 119 to a plate 121 secured to the table top 11.

Mounted on the bars 106, as by screws 133, is a drill bushing 134 which has a cylindrical bore 135 therethrough vertically aligned with the discharge channel 101. The undersurface of the bushing 134 has a rectangular groove 136 therein to receive the bar 113, as shown in Fig. 8.

Extending radially through bushing 134 into bore 135 are a plurality of bores 137, illustratively three in number, spaced 120 degrees apart to accommodate the drills 24, as is clearly shown in Fig. 9. The diameter of bores 137 is only slightly larger than the diameter of the drills, to restrain vibration of the latter and the diameter of bore 135 is only slightly larger than the diameter of the insert 13 to be drilled to restrain lateral movement thereof.

By merely removing screws 133, the drill bushing 134 may readily be replaced by another bushing having bores 135 and 137 of different diameters, depending upon the diameter of the insert to be drilled and the diameter of the drilled holes desired.

Means are provided, securely to clamp the insert 13 in the holding unit 15 during the drilling operation and to remove the insert after the drilling operation has been completed.

To this end the clamping unit 16 shown in Fig. 5, is provided. This unit may comprise a stand 141 secured to the table top 11 and rising therefrom, said stand having a horizontal shelf 142 extending over the drill bushing 134. Secured to shelf 142 and rising therefrom is a reciprocating device such as an air cylinder 143 having a control valve 144, the plunger rod 145 of cylinder 143 extending through the shelf 142 and removably mounting a plunger 146 at its free end, said plunger being axially aligned with the bore 135 in drill bushing 134.

Secured to the lower end of the plunger rod 145 is a horizontal strip 147, to the free end of which is secured the lower end of a vertical rod 148 which extends through the shelf 142.

Secured to the rod 148 above the shelf 142, is an actuating arm 149 which in the lowermost position of the rod 147 engages the control member of a micro-switch 151 secured to the shelf 142 and in the uppermost position of the rod 148 engages the control member of a micro-switch 152 mounted on a support 153 rising from shelf 142.

The upper end of rod 148 mounts a cam 155 which when the rod 148 is approaching its lowermost position will engage the roller 156 at the end of the actuating arm 157 of micro-switch 158 to actuate the latter.

To ready the equipment for operation, a drill bushing 134 having a bore 135 of suitable diameter to accommodate the insert to be drilled without lateral movement and bores 137 of diameter to accommodate the drills 24 without vibration, is mounted on end walls 106 by means of screws 133.

A block 113 of height such that when the insert 13 to be drilled is resting thereon, the drilled openings will be at the desired height above the lower end of the insert, is mounted on bar 111 as by screws 112.

A plunger 146 of suitable diameter such that it may enter the bore 135 to press against the upper end of the insert 13 therein is mounted on rod 145 and drills 24 of desired diameter are mounted in chucks 23.

Transfer bars 52, 53 having clamping conformations of suitable configuration, securely to hold the insert, are mounted on feed plate 36 and the feed tube 83 is charged with the inserts to be drilled. The transfer bars 52, 53 are of such thickness, depending upon the length of the insert, that with the lower end of the insert 13 resting on the post 81, the upper end of the insert will be slightly above the top surface of the transfer bars, as shown in Fig. 3, and the equipment is ready for operation.

Assuming that the drilling units 12 are in retracted position, the plunger 146 is in its uppermost position and the slide 109 and the feed plate 36 are retracted, the cycle may be started by pressing a start button (not shown).

As a result, through a suitable control circuit (not shown) which would be readily apparent to one skilled in the art, the air cylinder 29 is actuated to advance the feed plate 36. As a result, the pin 75 will move away from finger 74 and the spring 56 will cause the conformations 63, 64 at the ends 62, 61 of bars 52, 53 to grip the insert therebetween. As the gripped insert is moved away from the discharge end of the feed tube 83 (Fig. 3) the next insert in the tube will be supported by the top surface of the bar 52 as the latter is advanced.

At the same time as air cylinder 29 is actuated, air cylinder 118 is also actuated to move the block 113 beneath the bore 135 of the drill bushing 134 and this is accomplished before the insert 13 gripped by the transfer bars is positioned directly over the bore 135 of the drill bushing 134.

At this time, the pin 92 carried by feed plate 36, will engage the roller end of arm 89 of micro-switch 87 to actuate the latter. This will actuate the valve 144 of air cylinder 143 to lower the plunger 146 so that it forces the insert from the transfer bars 52, 53 into the bore 135 of the bushing 134, securely to retain the insert against block 113, as shown in Fig. 8.

As the plunger 146 of air cylinder 143 is lowered, the cam 155 carried by rod 148 will engage the roller end 156 of arm 157 of micro-switch 158 to actuate the latter. This will energize the advancing means of the conventional drilling units 12, the drills of which are rotating, and the drills will be moved through the bores 137 of the bushing 134 to drill holes 26 in the insert 13 clamped in bore 135. At the same time as the drilling units are advanced, the actuation of micro-switch 158 will also cause the feed unit 36 to be retracted, the clamping conformation 64 on the transfer bar 53 camming past the plunger 146.

When the feed plate reaches its retracted position, with the conformations 63 and 64 aligned with the post 81, the finger 74 will have engaged pin 75 to move the end 61 of the transfer bar 53 away from the end 62 of transfer bar 52. Since at this time the next insert in the feed tube 83 which has been restrained from downward movement as it is supported by the bar 52, will be free to drop, it will do so and hence rest on post 81 between the open clamping conformations 63, 64.

When the drilling operation is completed, the drilling units will automatically retract and when they all have reached their retracted position, a circuit will be completed to energize valve 144 to retract the plunger 146.

When the rod 148 reaches its uppermost position, the strip 149 will actuate micro-switch 152 which, through suitable control circuits (not shown), will again actuate valve 144 to lower the plunger 146 and at the same time actuate air cylinder 118 to retract the bar 113.

As the plunger 146 approaches its lowermost position, it will abut against the drilled insert 13 forcing the latter downwardly through bore 135 into discharge conduit 101 from which it will fall through opening 102 in table 11 into a suitable receptacle R. When the plunger 146 reaches its lowermost position, the strip 149 will actuate micro-switch 151 which will actuate the valve 144 to lift the plunger 146 to complete the cycle.

When the strip 149 carried by rod 145 again actuates micro-switch 152, this will actuate air cylinders 29 and 118 to advance the feed plate 36 and the slide 109 as previously described, and the cycle will then repeat.

With the equipment above described, inserts of the type described may automatically and rapidly be drilled. As the drills 24 are restrained from vibrating by reason of the bores 137 of the drill bushing 134, there is assurance that substantially no burrs will be formed in the insert which would interfere with proper insertion thereof. By reason of the adjustable bar 113, with but a single setting, the drilled holes 26 may be properly located so that they will all be at the same distance from the bottom of the insert. By reason of such positioning, the insert may readily be driven into an opening in the material in which it is to be positioned without undue build-up of torque which might cause stripping of the internal threads of the insert or the threads of the driving tool.

As the bore in the drill bushing 134 is substantially the same diameter as the diameter of the insert, the latter may be retained in the bore 135 by the plunger 146 so that it is axially aligned with the bore. Thus, the drills will form radial holes which is desirable for effective tapping action.

As many changes could be made in the above construction, and many apparently widely different embodiments of this invention could be made without departing from the scope of the claims, it is intended that all matter contained in the above description or shown in the accompanying drawings, shall be interpreted as illustrative and not in a limiting sense.

Having thus described my invention, what I claim as new and desire to secure by Letters Patents of the United States is:

1. Equipment for drilling a plurality of holes in a cylindrical insert, comprising a holder having a vertical bore to receive the insert and lateral bores leading into the vertical bore, a slidable member movable beneath said vertical bore, means to position an insert above and in vertical alignment with said vertical bore, a reciprocable plunger aligned with said vertical bore, means when said insert is in alignment with said vertical bore to actuate said plunger to move the insert into said vertical bore, the downward movement of the insert being limited by said slidable member, whereby said insert is clamped between the slidable member and the plunger, a plurality of reciprocable drilling units each movable in a horizontal plane toward and away from the holder, each of said units having a drill movable through an associated lateral bore in said holder, means when the insert is clamped against the slidable member by the plunger to effect reciprocation of the drilling units to drill a plurality of holes in the clamped insert, means when the drilling units move away from the holder, to effect movement of the plunger away from the insert and to effect movement of the slidable member away from the lower end of the vertical bore for subsequent ejection of the drilled insert therefrom.

2. The combination set forth in claim 1 in which means are provided after movement of the slidable member away from the lower end of the vertical bore to thereupon effect movement of the plunger into the vertical bore to eject the insert therefrom.

3. The combination set forth in claim 1 in which means are carried by said slidable member to determine the location of the drilled openings in the insert with respect to the lower edge of the latter.

4. The combination set forth in claim 1 in which said holder has a slot extending at right angles to the vertical bore and below the latter, and said slidable member has a block releasably secured to the upper surface thereof and movable through said slot beneath said vertical bore, said insert being moved against said block when the plunger is actuated.

5. The combination set forth in claim 1 in which a reciprocating device actuates said slidable member.

6. The combination set forth in claim 1 in which a reciprocating device is provided to actuate said plunger, said device having a reciprocable rod to which the plunger is connected, a pair of switch means respectively actuated when the rod is at the upper extremity of its stroke to effect the positioning of the insert above the vertical bore in the holder and the slidable member beneath said vertical bore and when the rod is at the lower extremity of its stroke to effect lifting of the plunger, and switch means actuated during the downward movement of the rod while the insert is clamped to effect reciprocation of the drilling units.

7. The combination set forth in claim 1 in which the insert positioning means comprises an insert gripping member, means to reciprocate the gripping member between a retracted position and an extended position with the insert aligned with the vertical bore in said holder.

8. The combination set forth in claim 7 in which means are provided to charge the gripping member with an insert when it is in retracted position.

9. The combination set forth in claim 1 in which the insert positioning means comprises a pair of transfer bars, each having a complementary gripping conformation at one end, to grip the insert therebetween, means normally urging one of said gripping conformations toward the other, means to reciprocate said transfer bars between a retracted position and an extended position with the insert aligned with the vertical bore in said holder, and means to space said gripping conformation to receive an insert when the transfer bars are in retracted position.

10. The combination set forth in claim 1 in which the insert positioning means comprises a fixed clamping conformation, a movable clamping conformation associated therewith, and normally urged toward the fixed clamping conformation to grip an insert therebetween, means to reciprocate said clamping conformations between a retracted position and an extended position with the insert aligned with the vertical bore in said holder, and means to space said clamping conformation to receive an insert when the clamping conformations are in retracted position.

11. The combination set forth in claim 1 in which the insert positioning means comprises a feed plate, a transfer bar fixed at one end to said plate and extending outwardly therefrom, a second transfer bar pivoted at one end to said plate and extending outwardly therefrom substantially parallel to said first transfer bar, each of said bars having a clamping conformation at the free end thereof, resilient means normally urging the free end of the pivoted bar toward the free end of the other bar to grip an insert therebetween, means to reciprocate said feed plate between a retracted position and an extended position with the insert aligned with the vertical bore in said holder, a projection carried by said pivoted bar and a cam in the path of movement of said projection to move the free end of the pivoted bar away from the free end of the other bar to space the clamping conformation to receive an insert when the feed plate is in retracted position.

12. The combination set forth in claim 11 in which a stop member is provided, positioned beneath the plane of said transfer bars and vertically aligned with said clamping conformations when the feed plate is in retracted position, a feed tube is vertically aligned with said stop member and positioned above the plane of said transfer bars, the spacing between the lower end of the tube and the stop being slightly greater than the length of the insert.

13. The combination set forth in claim 11 in which the means to actuate said plunger comprises switch means actuated by said feed plate when the latter has moved to extended position.

14. The combination set forth in claim 11 in which means are provided to dampen the movement of said feed plate immediately prior to its reaching its extended position.

References Cited in the file of this patent

UNITED STATES PATENTS

| | | |
|---|---|---|
| 2,344,053 | O'Callaghan | Mar. 14, 1944 |
| 2,369,828 | Humphreys | Feb. 20, 1945 |
| 2,390,420 | Burke | Dec. 4, 1945 |
| 2,443,655 | Stupakoff et al. | June 22, 1948 |
| 2,781,531 | Byam | Feb. 19, 1957 |
| 2,811,876 | Batchelder | Nov. 5, 1957 |